United States Patent
Asendorf et al.

(10) Patent No.: US 7,803,227 B2
(45) Date of Patent: Sep. 28, 2010

(54) MEANS AND METHOD FOR SEALING CONSTRUCTIONS

(75) Inventors: Knut Asendorf, Bad Kreuznach (DE); Falk Kittler, Flöha (DE)

(73) Assignees: Concolid Technik Deutschland GmbH, Bensheim (DE); Sachsische Bau GmbH, Dresden (DE)

( * ) Notice: Subject to any disclaimer, the term of this patent is extended or adjusted under 35 U.S.C. 154(b) by 1098 days.

(21) Appl. No.: 10/557,620

(22) PCT Filed: Mar. 16, 2004

(86) PCT No.: PCT/DE2004/000528

§ 371 (c)(1), (2), (4) Date: Nov. 18, 2005

(87) PCT Pub. No.: WO2004/083532

PCT Pub. Date: Sep. 30, 2004

(65) Prior Publication Data

US 2007/0059108 A1    Mar. 15, 2007

(30) Foreign Application Priority Data

Mar. 19, 2003  (DE)  ................................ 103 12 325

(51) Int. Cl.
  *C04B 14/00*  (2006.01)
(52) U.S. Cl. ....................... 106/811; 106/900
(58) Field of Classification Search ............... 106/811, 106/284, 287, 468, 900; 405/263, 270
See application file for complete search history.

(56) References Cited

U.S. PATENT DOCUMENTS 2,754,623 A * 7/1956 Mowry et al. ............ 47/1.01 R
4,964,918 A * 10/1990 Brown et al. ............... 106/811
6,340,385 B1 * 1/2002 Wammes ............... 106/287.17

FOREIGN PATENT DOCUMENTS

DE   1290007   2/1969
DE   3812705   10/1989
DE   3914685   11/1990

(Continued)

OTHER PUBLICATIONS

XP-002289135, V.I. Giurgea, "Hydrogeological and Geotechnical Preconditions for the Design of Sites for Storing Radioactive Residues Taking Into Account the CONSOLID System", Karlsruhe, 1999.

*Primary Examiner*—Anthony J Green
*Assistant Examiner*—Pegah Parvini
(74) *Attorney, Agent, or Firm*—Michael L. Dunn

(57) ABSTRACT

A flexible seal for constructions and method of using such seals where the seals include a mixture of soil and a polymeric additive including polymeric methacrylamide, which additive opens a water casing around soil grains, wherein 1 m$^3$ of soil contains up to 0.5% by volume of the additive wherein the additive also contains saponified paraffins or further contains between 15 kg and 25 kg of cement and/or lime per 1 m$^3$ of soil which cement and/or lime in turn contains 1% by weight to 10% by weight of the additive or wherein a proportion of between 20% by weight and 50% by weight of water is added to the mixture to make it capable of flow.

6 Claims, 3 Drawing Sheets

FOREIGN PATENT DOCUMENTS

| | | |
|---|---|---|
| DE | 4235378 | 4/1994 |
| DE | 4237999 | 5/1994 |
| DE | 19542031 | 7/1996 |
| DE | 19724939 | 12/1998 |
| DE | 19856327 | 1/2000 |
| EP | 1155732 | 11/2001 |
| GB | 907182 | 10/1962 |
| JP | 63223212 | 9/1988 |
| JP | 5039987 | 2/1993 |
| JP | 7224119 | 8/1995 |
| JP | 08041460 * | 2/1996 |

* cited by examiner

MEANS AND METHOD FOR SEALING CONSTRUCTIONS

BACKGROUND OF THE INVENTION

The invention concerns a means for and methods of sealing constructions, in particular earthwork constructions.

Means for and methods of sealing constructions, for example dams and dikes, which use concrete, for example water-impermeable concrete, as a sealing means, are known from the state of the art. The water-impermeable concrete can be introduced into already existing dikes through slot walls or bung bores. That procedure is disadvantageous however precisely in relation to dikes as a rigid body is formed within the dike, which cannot compensate for shifts in the foundation soil so that breaks and cracks can occur in the concrete sealing means. Cracks in the sealing means however mean that the dike or generally the construction becomes water-permeable again and there is the risk of underscouring.

In comparison the use of argillaceous mixtures for sealing constructions, earlier known as 'puddle', affords the advantage that this kind of sealing does not form a rigid sealing body so that shifts in foundation soil are compensated and no leaks can occur. Sealing arrangements for constructions comprising argillaceous mixtures involve water-impermeability of approximately the same level as sealing arrangements using concrete. Puddles on the dam outside are also relatively complicated and expensive, require a great deal of construction material, destroy the biotop on the dam surface and do not have particularly long service lives. They are also limited to use in relation to dams or dikes which can be dry at least during the building phase.

BRIEF SUMMARY OF THE INVENTION

In comparison with the state of the art the object of the invention is to provide a means for and a method of sealing constructions, which permits new and already existing constructions to be flexibly, inexpensively and permanently sealed with a high degree of sealing integrity, by the introduction of a core sealing means.

That object is attained in that the means for sealing constructions comprises a mixture of argillaceous materials and an additive which breaks open the enclosing water around the grain of the soil, wherein 1 m³ of soil contains up to 0.5% by volume, preferably between 0.01% by volume and 0.1% by volume and particularly preferably 0.03% by volume of the additive. In comparison with the conventional argillaceous mixtures such as for example bentonite, that modified soil mixture exhibits a substantially improved sealing action, wherein the flexible properties of the argillaceous mixtures from the state of the art are still retained. The quantitative ratio according to the invention between the additive and the soil achieves optimum water-impermeability. In that respect the concentration of the additive should not substantially exceed 0.5% by volume as, at higher levels of concentration, the additive has a film-forming effect around the soil.

DETAILED DESCRIPTION OF THE INVENTION

Figure 1:
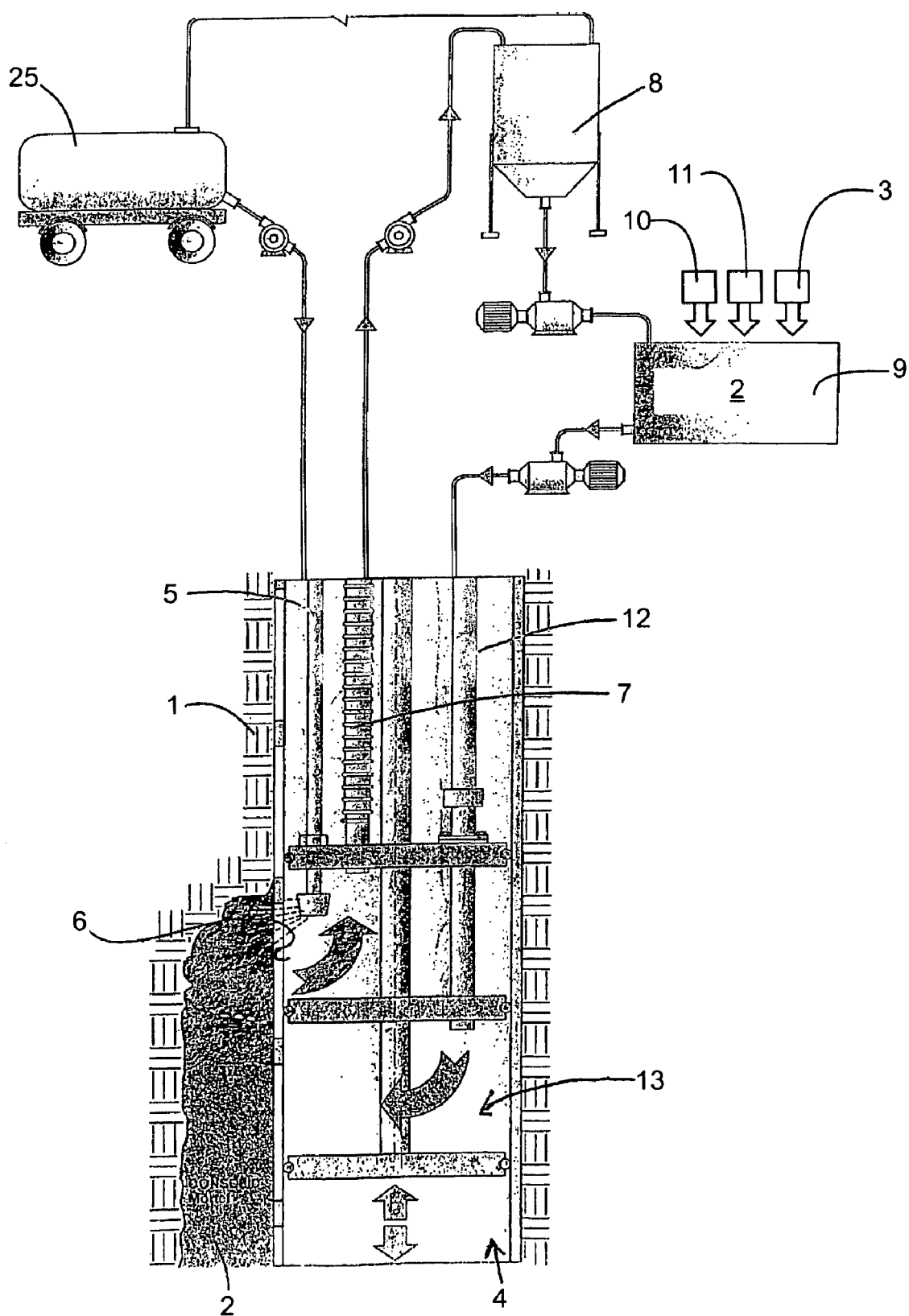
FIG. 1 shows a diagrammatic representation of the soil exchange process.

Introduction of the additive according to the invention into the soil mixture, by virtue of the water casing which generally surrounds the individual grain being broken open, obviously results in better coagulation by virtue of the stronger adhesion forces with which the individual particles of the soil can adhere to each other after their water casing has been broken open. By virtue of using the additive in the preferred embodiment of the invention, this provides that the mixture acquires a compact, viscous-plastic and water-impermeable consistency. Even after a forced drying-out operation the mixture remains stable and upon absorbing a small amount of water immediately assumes again the viscous-plastic, water-impermeable consistency. Because of the strong cohesion between the grains, plant roots cannot pass through the sealing means, nor can it be infested by small animals. In addition adjunction works are possible at any time as the mixture does not set. Undermining and erosion of the injection body in the case of flowing water does not occur.

In a preferred embodiment the additive is a polymer, in particular a polymeric (meth)acrylamide. When using polymeric additives K-values around $10^{-9}$ m/second are achieved. A possible explanation for achieving the high K-values could be the dense bedding of the soil constituents and the fact that the pores in the structure are filled up by the clay particles.

In addition a particularly preferred embodiment of the invention is one in which the additive contains saponified paraffins. The use of the polymeric (meth)acrylamide in conjunction with saponified paraffins is ecologically harmless so that the sealing means can be used in all ground water zones. Because of the low level of concentration of the additive a binding agent function is not possible and desired and is also not effected by any cement or lime admixtures, the concentration of which would also be too low for that purpose. There is no chemical reaction with the additive, but it acts substantially with a hydrophobing effect on the grain. Its action is comparable to that of a catalyst.

It is desirable if the soil in the present invention contains clay and/or coarse clay. A proportion of at least 10% by weight, preferably at least 15% by weight of clay and/or coarse clay has proven to be particularly advantageous. It is precisely the fine-grain constituents such as clay or coarse clay in the soil that, in conjunction with the additive, permit the formation of a compact, viscous-plastic and water-impermeable mass.

A preferred embodiment of the invention provides that a proportion of cement and/or lime which in turn contains a proportion of 1% by weight to 10% by weight, preferably 3.5% by weight of the additive, is added to the mixture. That addition is advantageous as it dilutes the additive and for example facilitates uniform distribution of the additive when injecting the mixture into an already existing construction. In that respect a particularly preferred embodiment of the invention is one in which between 15 kg and 25 kg, preferably 20 kg of the cement or lime containing the additive, is added to one cubic meter of soil. That amount permits optimum dilution of the additive upon injection into an existing construction. Mixing of additive and cement and/or lime can take place at the factory, that is to say not on site.

In order to make the mixture capable of flow, it is desirable if a proportion of between 20% by weight and 50% by weight, preferably between 25% by weight and 40% by weight and particularly preferably between 30% by weight and 35% by weight of water is added to the mixture. With that water content the mixture has thixotropic properties, that is to say the material can be pumped and conveyed but becomes jelly-like firm as soon as it comes to rest. After the excess water issues the Proctor density of the mixture is reached, that is to say with that water content, optimum compacting of the soil and the additive is achieved.

In regard to the method the object of the invention is achieved in that a mixture of soil and an additive, as has been described hereinbefore, is injected into a construction or is sprayed on at the surface using a wet flow method. That procedure makes it possible for an already existing construction to be sealed off subsequently, that is to say even years after it was constructed.

In a preferred embodiment of the invention firstly holes are bored into the construction, the hole walls being stabilised. The soil is then flushed out of the walls of the holes and a mixture of soil and an additive as has been described hereinbefore is pressed into the hole. That method makes it possible for the additive to be introduced even into constructions whose soil is already so greatly compacted that the additive cannot be introduced through cavities and/or porous intermediate spaces in the soil.

In a particularly preferred embodiment the walls of the bore holes are supported with a tube which has slots and the soil is flushed out through the slots and the mixture of soil and an additive as has been described hereinbefore is pressed into the construction through same or other adjacent slots or openings. Supporting the bore holes with a slotted tube prevents the walls of the bore holes falling in during the works and thus hindering the introduction of the sealing means into the construction. In that case the slotted tube advantageously remains in the bore hole during all stages.

In a particularly preferred embodiment of the method of the invention the operation of flushing out the soil and the operation of introducing the mixture of soil and additive are effected in one working step.

Depending on the foundation soil composition it may be desirable if additional substances with a high fine proportion, preferably clay and/or coarse clay, are added to the mixture of soil and an additive as has been described hereinbefore. That makes it possible for even constructions whose soil contains only small fine proportions to be subsequently very effectively sealed with the aforesaid method.

As an alternative to the specified method, in the case of injectable grounds, it may be advantageous for the above-described additive to be directly injected into cavities, holes and/or into the porous intermediate spaces of the soil of the construction so that it mixes there with the soil. That method permits introduction of the additive into the construction with a low level of complication and expenditure.

In a preferred embodiment of the invention rotating boring lances are used for injection of the mixture of soil and an additive in order to build up a cylindrical body of sealing material in the construction, with a defined injection pressure.

Further advantages, features and possible uses of the present invention will be apparent from the description hereinafter of a preferred embodiment and the related Figures.

FIG. 1 diagrammatically shows the exchange of the soil 1 by a mixture of the previously removed soil 1 and an additive 3. In the illustrated embodiment the additive used is a polymeric acrylamide in conjunction with saponified paraffins. That additive can be obtained under the trade name Consolid. Water is introduced into a slotted tube 4 under high pressure through a conduit 5 so that the soil is flushed out at the slots 6 of the tube. The mixture of soil and water is then sucked away from the slotted tube 4 by way of a conduit 7. After settlement in a settlement tank 8 the mixture of soil and water is mixed in a mixer 9 with parts of the drilling material 10 and the additive 3. Soil can possibly be mixed in the mixer with a higher fine proportion, for example coarse clay and/or clay. The modified clay mixture is then passed by way of a further conduit 12 back into a region 13 under the removal location of the slotted tube 4, under pressure. There it is used for filling the wall region 6 from which soil 1 was previously flushed out. In a concluding working operation, the slotted tube 4 is drawn out of the bore hole and the bore hole is filled with the modified clay mixture 2.

Figure 2:
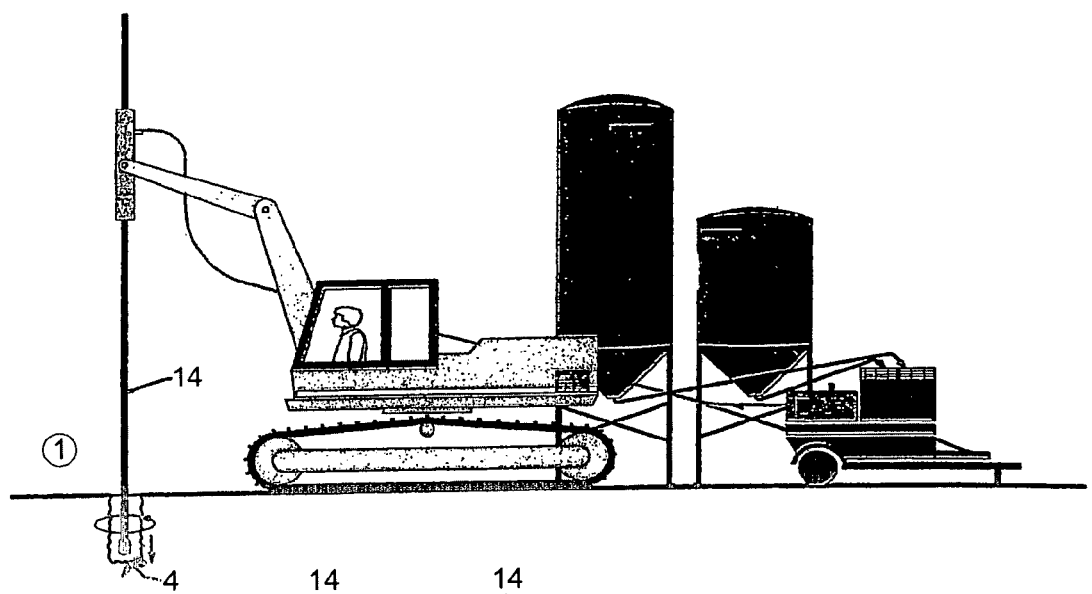
FIG. 2 shows a diagrammatic representation of the injection of mixture of soil and additive into a bore hole.

FIG. 2 diagrammatically shows the step of injecting the modified clay mixture with an additive, here Consolid, and optionally additional fine components, into a bore hole 4. For that purpose a hole 4 is bored with a rotating boring lance 14 and at the same time the modified clay mixture 2 is pressed thereinto.

Figure 3:
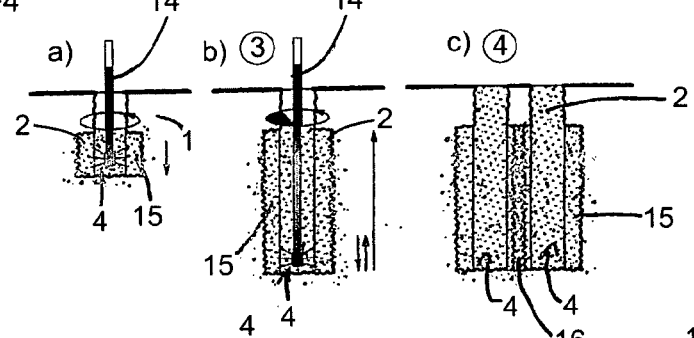
FIGS. 3a-c show diagrammatic representations of the stepwise procedure in the injection of the mixture of soil and an additive into a bore hole.

That can be particularly clearly seen in FIGS. 3a-c. FIGS. 3a and b show how the modified clay mixture is pressed into the bore hole during the operation of boring the hole with the lance 14. It can be seen in this respect how the modified clay mixture 2 also penetrates into the soil 1 in the regions 15 directly adjoining the bore hole 4.

FIG. 3c shows two mutually juxtaposed bore holes 4 which are already filled with the modified clay mixture 2. Their edge or surrounding regions 15 which are also penetrated by the modified clay mixture overlap in a region 16 so that in cross-section there is a continuous sealing surface formed from the modified clay mixture.

Figure 4:
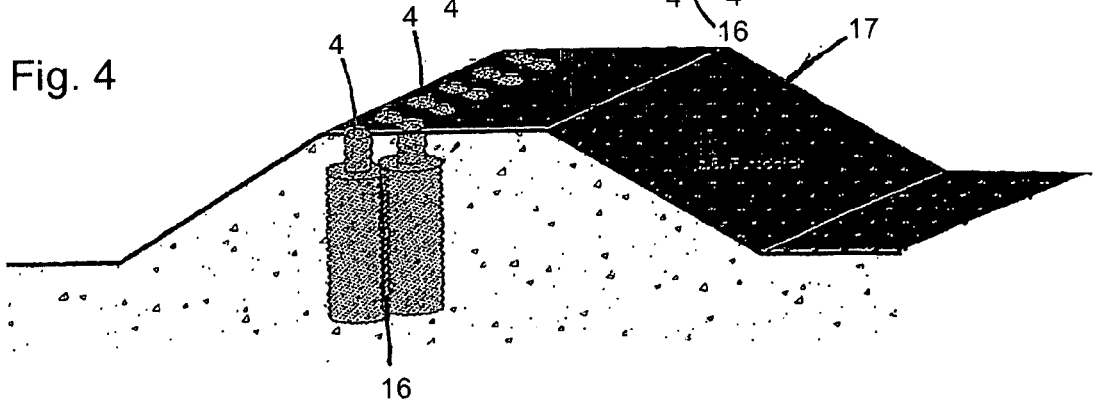
FIG. 4 shows a lateral view in section through a river dike with bore holes.

FIG. 4 particularly clearly shows the formation of a continuous sealing surface within a river dike. The choice of the arrangement of the bore holes 4 provides respective overlapping surrounding regions 6 around the bore holes, which are permeated by the sealing mixture, so that an interruption-free sealing arrangement in an already existing dike can be built up without having to excavate the dike over its entire length.

Figure 5:
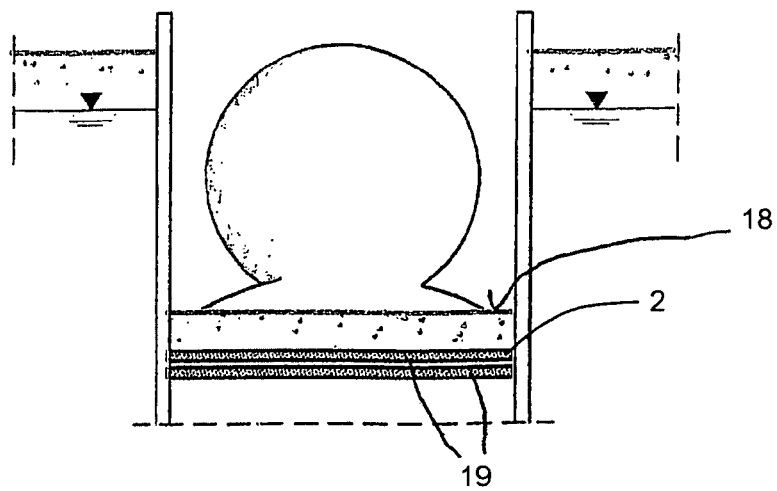
FIG. 5 shows a diagrammatic sectional view of a construction below ground level with surface sealing.

FIG. 5 shows an underground construction, the bottom surface 18 of which has been sealed with two sealing surfaces 19 of the modified clay mixture 2.

Figure 6:
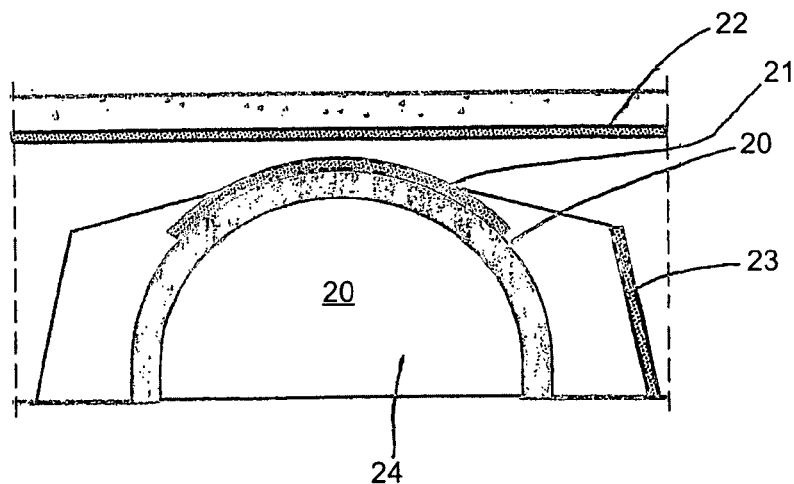
FIG. 6 shows a diagrammatic sectional view of a tunnel construction with various sealing arrangements.

FIG. 6 shows a tunnel, the rear surface 20 of which has been provided in the upper region with a seal 20 of the modified clay mixture 2. In addition it is also possible to see a seal 22 of modified clay mixture 2, which covers over the region of the tunnel tubes and the adjacent earth. Such cover arrangements are frequently used in the field of underground railway construction in which further traffic levels are arranged over the tunnel tubes. A further seal 23 in the region laterally of the tunnel tubes 24 can prevent for example ground water from penetrating into the tunnel tubes 24.

Figure 7:
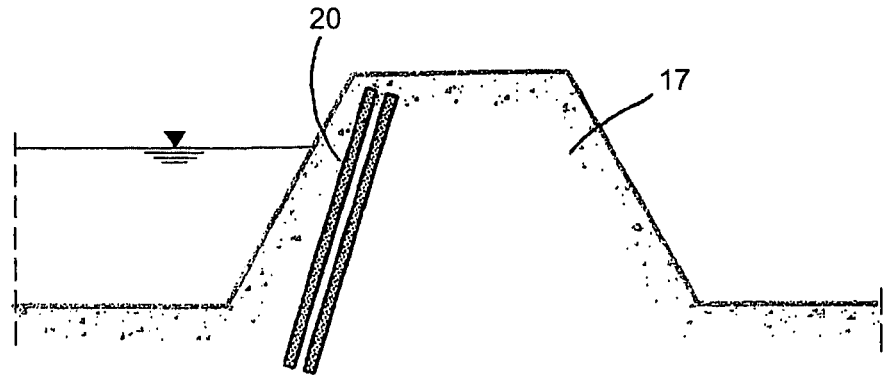
FIG. 7 shows a sectional view of a dike with vertical sealing.

FIG. 7 shows a so-called vertical seal 20 of a dike 17. For that purpose slots are excavated into the dike perpendicularly to the top thereof, in this case two slots, the slots being filled with the modified clay mixture 2 to seal off the dike 17.

The invention claimed is:
1. A means for flexible sealing of constructions comprising a mixture of soil and a polymeric additive comprising polymeric methacrylamide, which additive opens a water casing around soil grains, wherein 1 $m^3$ of soil contains up to 0.5% by volume of the additive wherein the additive also contains saponified paraffins.

2. A means for flexible sealing of constructions comprising a mixture of soil and a polymeric additive comprising polymeric methacrylamide, which additive opens a water casing around soil grains, wherein 1 m$^3$ of soil contains up to 0.5% by volume of the additive, wherein the means for flexible sealing of constructions further contains between 15 kg and 25 kg of cement and/or lime per 1 m$^3$ of soil which cement and/or lime in turn contains 1% by weight to 10% by weight of the additive.

3. A means for flexible sealing of constructions comprising a mixture of soil and a polymeric additive comprising polymeric methacrylamide, which additive opens a water casing around soil grains, wherein 1 m$^3$ of soil contains up to 0.5% by volume of the additive wherein a proportion of between 20% by weight and 50% by weight of water is added to the mixture to make it capable of flow.

4. A soil based construction comprising a flexible sealing means comprising a mixture of soil and a polymeric additive comprising polymeric methacrylamide, which additive opens a water casing around soil grains, wherein 1 m$^3$ of soil contains up to 0.5% by volume of the additive wherein the additive further contains saponified paraffins.

5. A soil based construction comprising a flexible sealing means comprising a mixture of soil and a polymeric additive comprising polymeric methacrylamide, which additive opens a water casing around soil grains, wherein 1 m$^3$ of soil contains up to 0.5% by volume of the additive wherein the flexible sealing means further contains between 15 kg and 25 kg of cement and/or lime per 1 m$^3$ of soil which cement and/or lime in turn contains 1% by weight to 10% by weight of the additive.

6. A soil based construction comprising a flexible sealing means comprising a mixture of soil and a polymeric additive comprising polymeric methacrylamide, which additive opens a water casing around soil grains, wherein 1 m$^3$ of soil contains up to 0.5% by volume of the additive wherein a proportion of between 20% by weight and 50% by weight of water is in the flexible sealing means to make it capable of flow.

\* \* \* \* \*